United States Patent

Menzel

[11] 3,885,742
[45] May 27, 1975

[54] ATTACHMENT OF DRIP FEED DEVICES TO HOSES OR THE LIKE

[75] Inventor: Stanley W. O. Menzel, Elizabeth, South Australia, Australia

[73] Assignee: Iplex Plastic Industries Pty. Ltd., Elizabeth, South Australia, Australia

[22] Filed: Feb. 6, 1974

[21] Appl. No.: 440,254

[30] Foreign Application Priority Data
Feb. 14, 1973  Australia............................ 2252/73

[52] U.S. Cl............. 239/272; 24/81 CC; 24/257 R; 222/89; 239/547; 285/188
[51] Int. Cl............................................. B05b 1/20
[58] Field of Search .......... 239/271, 272, 542, 547, 239/273; 285/DIG. 22, 188; 24/81 CC, 261 C, 259 C, 257 R, 257 A, 129 B, 137 R; 222/89

[56] References Cited
UNITED STATES PATENTS

| | | | |
|---|---|---|---|
| 2,590,726 | 3/1952 | Sawyer, Sr. ..................... 239/547 X |
| 2,685,719 | 8/1954 | Golden.......................... 24/257 R X |
| 2,820,655 | 1/1958 | Hileman....................... 285/DIG. 22 |
| 3,009,655 | 11/1961 | Palmer............................ 239/271 X |
| 3,729,142 | 4/1973 | Rangel-Garza et al. ............ 239/542 |
| 3,806,031 | 4/1974 | Olson............................. 239/272 X |

FOREIGN PATENTS OR APPLICATIONS

| | | | |
|---|---|---|---|
| 1,219,199 | 5/1960 | France............................... 285/188 |
| 718,950 | 11/1954 | United Kingdom................. 285/188 |

Primary Examiner—M. Henson Wood, Jr.
Assistant Examiner—Andres Kashnikow
Attorney, Agent, or Firm—Oldham & Oldham

[57] ABSTRACT

A drip feed device for irrigation of plants comprising a body having a first attachment to a supply line formed as a nipple adapted to be engaged in an aperture through the wall of the supply line to hold the body to the supply line and to place the drip feed device into communication with the water supply and a second attachment on the body remote from the nipple to engage the supply line and further hold the body to the supply line, the second attachment having a part shaped to partly surround the supply line and another part to hold the shaped part to the supply line when the body is orientated to engage the supply line.

2 Claims, 2 Drawing Figures

PATENTED MAY 27 1975 3,885,742

ATTACHMENT OF DRIP FEED DEVICES TO HOSES OR THE LIKE

This invention relates to the attachment of drip feed devices to hoses or the like.

BACKGROUND OF INVENTION

With drip feed devices used for instance in orchards, vineyards or the like, it is customary to use long lengths of hose and to position drip feed devices at regular intervals corresponding to the positioning of the trees or the like which are to be watered.

This involves the attachment of the drip feed devices to the hoses in such a manner that they can be readily engaged on the hoses by piercing the hose and inserting a nipple forming part of the drip feed device through the aperture in the hose to allow water to flow from the hose through the nipple into the drip feed device where its flow is then controlled by the regulating means.

The drip feed devices can be of any usual approved type and can for instance comprise a hollow body having a removable plug projecting into it between the periphery of which plug in the inside of the hollow body is formed a helical or other restricting channel to which the water has access from the nipple and which is of a length and dimension such that the flow of water through this channel causes the breaking down of the pressure in the water so that while substantial pressure may exist at the nipple, at the other end of the device water will only trickle out at a slow rate depending on the design of the component.

Such devices are well known and need not be described in this specification.

With nipples of this type however it is desirable to be able to hold them firmly to the hose and various forms of lock means have been provided but the object of the present invention is to provide a simple form of device which firmly engage the hose and be held thereto yet which can be removed and repositioned as required with a minimum of effort.

SUMMARY OF INVENTION

The invention preferably comprises a pair of members spaced some distance from the nipple by means of which water is admitted to the drip feed device, which members project from the drip feed device and are each arranged to partly encircle the hose but are so shaped that, for the devices to engage the hose, the drip feed device must be turned at an angle to the hose to allow the devices to engage the hose and if the drip feed device is then swung around and the nipple inserted through the aperture in the hose, a firm lock will result as the rotational movement of the nipple will cause the two parts of the locking means to firmly engage the hose so that the device can only be removed by first disengaging the nipple from the hose and turning the device to unhook the attachment means.

DESCRIPTION OF A TYPICAL FORM

Figure 1:
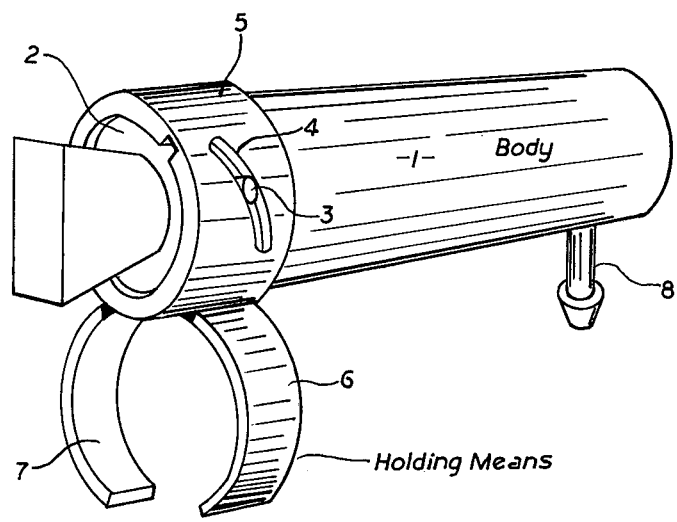
FIG. 1 is a perspective view of a typical drip feed device adapted to be removably engaged on a hose by inserting a nipple through an aperture in the hose to place the inside of the hose into communication with the drip feed device.

The drip feed device illustrated comprises an outer body 1 having a plug 2 within it which can be locked axially in the body 1 by a partial rotation to engage a pin 3 in an inclined slot 4 in an inclined slot 4 in an expanded portion 5 of the body 1.

Figure 2:
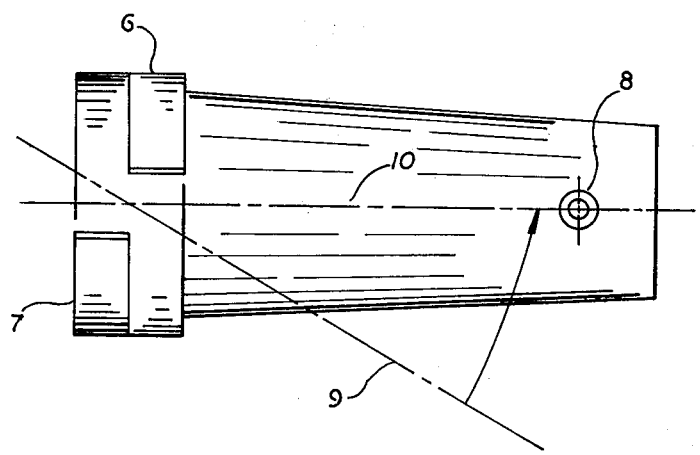
FIG. 2 is an underside view of the device.

The body 1 has the hollow inlet nipple 8 projecting from the end portion remote from the expanded portion 5, and the holding means consist of a pair of curved lugs 6 and 7 attached to the expanded portion 5 of the body 1. The lug 6 being nearer the nipple 8 than the lug 7, the curvature of the two lugs being opposite that is they bow outwards, and by having them spaced axially along a plane passing through the the nipple, it will be realized that because of the displacement of the two lugs 6 and 7 in an axial direction, they can readily engage over a hose with some distortion because of their spacing but when the drip feed device is then rotated to lie parallel to the hose, one of the lugs will extend part way around one side of the hose while the other lug will extend part way around the other side of the hose, the extension being sufficient to provide a lock which prevents the device from being pulled off from the hose. Then when he nipple is inserted through the aperture in the hose to hold the device in alignment with the hose, the end held by the lugs can not be dislodged from the hose and a firm grip thus results. In FIG. 2 the line 9 indicates the axial position of the hose when he lugs 6 and 7 are engaed on the hose, while the line 10 indicates the position of the hose when he device is locked by engaging the nipple 5 in an aperture in the hose.

While in the foregoing a typical form of attachment has been referred to in connection with a drip feed device of the general type utilizing a helical groove or the like, the invention can apply to other forms of drip feed devices where it is desired to lock the device to a hose, in each case the arrangement being such that there is at least one hooked shape member sufficiently removed in distance from the inlet nipple to the drip feed device.

One of the lugs 6 or 7 could be replaced by a peg, in which case the hose is passed between the two holding members referred to, and by then orientating it to bring the nipple into engagement with the aperture in a hose through which the device is to be fed, the two locking members will be positioned to firmly engage the two sides of the hose to form a firm grip which can not be released unless the nipple is first released and the device again orientated back to its original position to allow the locking means to disengage.

I claim:

1. A drip feed device comprising,
   an elongaged body,
   an inlet nipple near one end of said body adapted to be engaged in an aperture through the walls of a supply line to hold the body to the supply line and to place the drip feed device into communication with the water supply in said supply line, and
   holding means on the said body remote from the said nipple to engage the said supply line and further hold the said body to the supply line when the nipple is engaged in the supply line, said holding means comprising two members, one at least shaped to partly surround the said supply line, the other positioned to hold the said shaped member to the supply line when the said nipple is engaged in the suppply line, the one said member being nearer to the said nipple than the other, whereby the said members can be engaged on the supply line when the body is angled to the supply line and then caused to hold to the said supply line when the body is orientated to engage the nipple in the aperture in the supply line.

2. A drip feed device according to claim 1 wherein both said holding members are of curved shape to partly surround said supply line when engaged thereon.

* * * * *

UNITED STATES PATENT OFFICE
CERTIFICATE OF CORRECTION

Patent No. 3,885,742           Dated  May 27, 1975

Inventor(s)  Stanley W. O. Menzel

It is certified that error appears in the above-identified patent and that said Letters Patent are hereby corrected as shown below:

Column 2, line 27, after "when", change "he" to -- the --; after "are", change "engaed" to -- engaged.

Column 2, line 28, after "when", change "he" to -- the --.

Column 2, line 67, change "suppply" to -- supply --.

Signed and Sealed this nineteenth Day of August 1975

[SEAL]

Attest:

RUTH C. MASON
*Attesting Officer*

C. MARSHALL DANN
*Commissioner of Patents and Trademarks*